United States Patent
Srivastava et al.

(10) Patent No.: US 12,070,733 B2
(45) Date of Patent: Aug. 27, 2024

(54) MODIFIED CARBON ADSORBENTS

(71) Applicant: ENTEGRIS, INC., Billerica, MA (US)

(72) Inventors: Reena Srivastava, Franklin, MA (US); Baoquan Xie, Hopkinton, MA (US); Frank V. Belanger, Webster, MA (US); Rocky D. Gipson, Arroyo Grande, CA (US)

(73) Assignee: ENTEGRIS, INC., Billerica, MA (US)

( * ) Notice: Subject to any disclaimer, the term of this patent is extended or adjusted under 35 U.S.C. 154(b) by 65 days.

(21) Appl. No.: 17/522,970

(22) Filed: Nov. 10, 2021

(65) Prior Publication Data
US 2022/0152579 A1    May 19, 2022

Related U.S. Application Data

(60) Provisional application No. 63/115,391, filed on Nov. 18, 2020.

(51) Int. Cl.
*B01J 20/20* (2006.01)
*B01D 53/02* (2006.01)
(Continued)

(52) U.S. Cl.
CPC .............. *B01J 20/20* (2013.01); *B01D 53/02* (2013.01); *B01J 20/28064* (2013.01);
(Continued)

(58) Field of Classification Search
CPC ........................... B01J 20/20; B01J 20/28064; B01J 20/28066; B01J 20/282; B01J 20/3071;
(Continued)

(56) References Cited

U.S. PATENT DOCUMENTS 6,043,183 A    3/2000   Alford
6,060,424 A *  5/2000   Alford .................. H01G 11/24
                                                         502/433
(Continued)

FOREIGN PATENT DOCUMENTS

EP    2081676 B1    5/2016
EP    3476476 B1    9/2021
(Continued)

OTHER PUBLICATIONS

Kilduff et al.; "Preloading of GAC by natural organic matter: effect of surface chemistry on TCE uptake"; Studies in Surface Science and Catalysis 144; Elsevier Science B.V.; pp. 553-530; 2002.
(Continued)

*Primary Examiner* — Colin W. Slifka
*Assistant Examiner* — Logan Edward Laclair

(57) ABSTRACT

Provided are certain activated carbonaceous materials which have been treated with dilute mineral acids to modify their surface chemistry and morphology. The modified activated carbonaceous materials of the disclosure are useful in removing certain contaminants from gaseous streams. In one embodiment, the contaminants are compounds containing silicon and oxygen moieties, such as alkyl silanols and alkyl siloxanes. The modified activated carbonaceous materials can be incorporated into filters and filter systems.

20 Claims, 2 Drawing Sheets

(51) Int. Cl.
  *B01J 20/28*   (2006.01)
  *B01J 20/282*  (2006.01)
  *B01J 20/30*   (2006.01)

(52) U.S. Cl.
  CPC ....... *B01J 20/28066* (2013.01); *B01J 20/282* (2013.01); *B01J 20/3071* (2013.01); *B01J 20/3085* (2013.01); *B01D 2253/102* (2013.01); *B01D 2253/306* (2013.01); *B01D 2253/308* (2013.01); *B01D 2257/70* (2013.01); *B01D 2258/06* (2013.01)

(58) Field of Classification Search
  CPC ... B01J 20/3085; B01J 2220/40; B01D 53/02; B01D 2253/102; B01D 2253/306; B01D 2253/308; B01D 2257/70; B01D 2258/06; B01D 2253/31; B01D 2257/553; B01D 53/04; B01D 2257/556
  See application file for complete search history.

(56) References Cited

U.S. PATENT DOCUMENTS

| | | |
|---|---|---|
| 6,589,904 B1 | 7/2003 | Hideharu |
| 8,759,253 B2 | 6/2014 | De Leede |
| 9,023,755 B2 | 5/2015 | Herrera |
| 2020/0303738 A1 | 9/2020 | Tabata |

FOREIGN PATENT DOCUMENTS

| | | |
|---|---|---|
| JP | 2000302428 A | 10/2000 |
| JP | 2005177737 A | 7/2005 |
| WO | 2013155499 A1 | 10/2013 |

OTHER PUBLICATIONS

Shafeeyan, M., et al.; "A review on surface medication of activated carbon for carbon dioxide adsorption"; Journal of Analytical and Applied Pyrolysis 89 (2010), pp. 143-151.

* cited by examiner

MODIFIED CARBON ADSORBENTS

This application claims the benefit under 35 USC 119 of U.S. Provisional Patent Application No. 63/115,391, filed Nov. 18, 2020, the disclosure of which is hereby incorporated herein by reference in its entirety.

TECHNICAL FIELD

The invention relates generally to certain carbonaceous materials which have been modified to advantageously absorb compounds containing silicon and oxygen, such as trimethyl silanol.

BACKGROUND

Modern semiconductor fabrication plants have multiple sections, many of which involve the use of highly specialized and expensive equipment. One such section involves the use of photolithography operations. Photolithography operations utilize equipment such as scanners, which contain performance-critical optical systems (i.e., lenses). When ambient or in-system chemical contaminants, such as those contaminants comprising trialkyl silanols and/or alkyl siloxanes are present, the combination of DUV light and oxygen produces $SiO_2$. The $SiO_2$ thus produced tends to irreversibly deposit on the lenses, thereby leading to lens haze and causing pattern non-uniformity. The lenses are ultimately rendered unfit for use and thus such contamination leads to necessary replacement of these lenses. Accordingly, a need exists for the removal of ambient and in-system chemical contaminants such as trialkyl silanols and/or alkyl siloxanes in such photolithography operations.

Siloxanes are used in many industrial products and in the case of lower molecular weight siloxanes, can be in a vapor form at room temperatures. As with trialkyl silanols, such siloxanes can react with oxygen to provide silicon dioxide, which can form harmful deposits on machinery and instrumentation.

SUMMARY

In summary, the disclosure relates to activated carbon materials which have been treated with dilute mineral acids to modify their surface chemistry and morphology. The modified activated carbons of the invention are useful in removing certain contaminants from gaseous streams. In one embodiment, the contaminants are compounds containing silicon and oxygen moieties, such as alkyl silanols and alkyl siloxanes. In another aspect, the modified activated carbons can be incorporated into filters and filter systems. In one embodiment, the materials as described herein can be utilized in conjunction with scanner pre-filter systems such as OEM scanner integrated filter systems sold by Entegris, Inc., such as those marketed under the names VaporSorb and SilverSet.

BRIEF DESCRIPTION OF THE DRAWINGS

The disclosure may be more completely understood in consideration of the following description of various illustrative embodiments in connection with the accompanying drawings.

DETAILED DESCRIPTION

Figure 1:
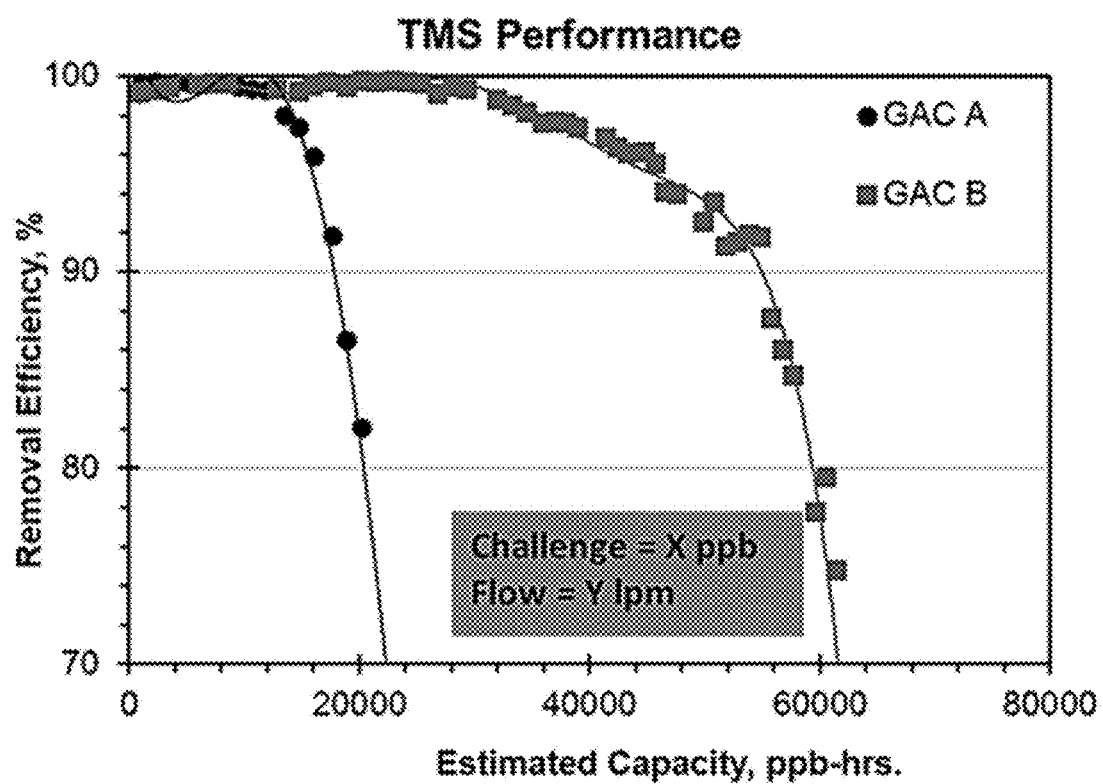
FIG. 1 is a graph of removal efficiency versus estimated capacity (in ppb-hours) for removal of trimethyl silanol using an adsorbent of the disclosure.

As used in this specification and the appended claims, the singular forms "a", "an", and "the" include plural referents unless the content clearly dictates otherwise. As used in this specification and the appended claims, the term "or" is generally employed in its sense including "and/or" unless the content clearly dictates otherwise.

The term "about" generally refers to a range of numbers that is considered equivalent to the recited value (e.g., having the same function or result). In many instances, the term "about" may include numbers that are rounded to the nearest significant figure.

Numerical ranges expressed using endpoints include all numbers subsumed within that range (e.g., 1 to 5 includes 1, 1.5, 2, 2.75, 3, 3.80, 4 and 5).

One aspect of the disclosure comprises a method for removing a contaminant from a gas stream, the method comprising:
  contacting said gas stream with an adsorbent comprising an activated carbonaceous material which has been treated with a dilute solution of at least one acid having a pKa from about 1 to about 5 (such as a mineral acid or an organic acid), followed by washing with water and drying,
  wherein the contaminant is chosen from (i) $C_1$-$C_{20}$ alkyl silanols, (ii) $C_1$-$C_{20}$ silanols substituted by one or more halogen atoms (such as fluorine, chlorine, bromine, etc.), or (iii) compounds of the formula

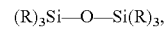

$(R)_3Si—O—Si(R)_3$, wherein R is chosen from $C_1$-$C_{20}$ alkyl or $C_1$-$C_{20}$ alkyl substituted by one or more halogen atoms (such as fluorine, chlorine, bromine, etc.).

In this aspect, the disclosure provides a facile method for removing various contaminants having silicon and oxygen atoms as their core features. In some embodiments, the contaminants are $C_1$-$C_{20}$ alkyl silanols, such as trimethyl silanol, which can be present in ambient air and in-system processes photolithography operations and higher carbon siloxanes, such as those containing from 15 to 20 carbon alkyl and fluoroalkyl chains, which can be found in industrial greases and lubricating oils, thus also providing a means for exposing critical optical systems to reaction by-products such as $SiO_2$. In some embodiments, the siloxanes are chosen from $(CH_3)_3Si—O—Si(CH_3)_3$; $(CH_3CH_2)_3Si—O—Si(CH_2CH_3)_3$; hexamethylcyclotrisiloxane, octamethyltrisiloxane, octamethylcyclotetrasiloxane, decamethylcyclopentasiloxane, decamethyltetrasiloxane, dodecamethylpentasiloxane, dodecamethylcyclohexasiloxane, or any combination thereof.

The adsorbents of this disclosure can be derived from any carbonaceous material which may be capable of being converted to activated carbon. Examples of such carbonaceous materials include, but are not limited to, wood, corncobs, kelp, coffee beans, rice hulls, fruit pits, peat, lignite, coconut shell, petroleum and/or coal pitch, cokes, carbon black, phenolic resin, polyvinyl chloride, etc. The morphology of the carbonaceous material is not critical, and can be chosen from granules, particulates, fibers, sheets, etc., although granules may be advantageously used in certain gas filter designs such as air filters. In some embodiments, the carbonaceous material is in granular or extruded form. In some embodiments, the carbonaceous material is derived from coconut shells. As used herein, the term "activated carbonaceous material" refers to a solid microporous material with high surface area comprised primarily of elemental carbon and in the case of lignin-derived carbonaceous materials, further containing small amounts of other trace elements originally found in the carbonaceous materials from which the activated carbon was formed. Additionally, the activated carbon can be derived from totally synthetic (i.e., petrochemical) sources, for example polystyrene or poly(vinyl dichloride), provided that in any case, the ultimate activated carbon surface possesses the requisite porosity so as to be effective in the method of this disclosure after modification as taught herein. In this context, activated carbon is a microcrystalline, non-graphitic form of carbon which is processed to increase its porosity. The surface area of an activated carbon depends on its pore volume. The surface area per unit volume decreases as individual pore size increases, so surface area is maximized by increasing the number of pores of very small dimensions and/or limiting the number of pores of large dimensions. Pore sizes are defined by the International Union of Pure and Applied Chemistry as micropores (pore width <2 nm), mesopores (pore width 2-50 nm), and macropores (pore width >50 nm). Further in such activated carbon, the micropores and mesopores contribute to the adsorptive capacity of the activated carbon, whereas the macropores actually reduce the density and can be detrimental to the adsorbent effectiveness of the activated carbon, on a carbon volume basis. Also, as used herein, the term "primary micropore", refers to a pore width of greater than or equal to 0, but less than 0.8 nm, and the term "secondary micropore" refers to pore widths of greater than or equal to 0.8 nm but less than 2 nm.

Activation of carbonaceous materials may be conducted by known methods. For example, the carbonaceous material may be activated with an oxidizable chemical, such as zinc chloride, phosphoric acid, sulfuric acid, calcium chloride, sodium hydroxide, potassium bichromate, potassium permanganate or the like (chemical activation); or with steam, propane gas, exhaust gas generated from combustion gas which is a mixture of $CO_2$ and $H_2O$, carbon dioxide gas or the like (gas activation). See, for example, U.S. Pat. No. 6,589,904, incorporated herein by reference in its entirety.

In general, commercially available activated carbons typically possess a surface area in the range of about 400 to 2500 $m^2/g$; this feature enables its use in the purification of liquids and gases by adsorption of various contaminants. The adsorbents of the present disclosure are such activated carbons which have been treated with a dilute acid have a pKa in a range about 1 to about 5, that are washed with water and dried. In some embodiments, the acid has a pKa in a range from about 1 to about 5, about 1 to about 4, about 1 to about 3, about 2 to about 5, about 2 to about 4, and all ranges and subranges therebetween. In some examples, the acid is a mineral acid or an organic acid. Examples of mineral acids having a pKa from about 1 to about 5 include, but are not limited to as hydrochloric acid, sulfuric acid, phosphoric acid, hydrobromic acid, or nitric acid. Examples of organic acids having a pKa from about 1 to about 5 include, but are not limited to, citric acid, chloroacetic acid, formic acid, lactic acid, and ascorbic acid This dilute acid treatment was found to affect both the surface chemistry of the activated carbon as well as its pore size, pore shape, and pore size distribution, along with its relative hydrophilicity. The activated carbons so modified were found to be particularly effective in removing contaminants such as those described herein, in particular trimethyl silanol. The modified activated carbons of the present disclosure may have a surface area as measured by the BET method of greater than or equal to about 500 to less than or equal to about 1400 $m^2/g$, greater than or equal to about 900 to less than or equal to about 1200 $m^2/g$, and any and all ranges and subranges therebetween, such as greater than or equal to about 1050 to less than or equal to about 1150 $m^2/g$. Additionally, the modified carbons of the present disclosure may have a surface area ratio of micropores to mesopores as measured by the t-plot method of greater than or equal to about 13 to less than or equal to about 17, and any and all ranges and subranges therebetween, such as greater than or equal to about 13 to less than or equal to about 15, or about 14. Additionally, the modified carbons of the disclosure may have a pore volume ratio as measured by the DFT method of (primary micropores):(secondary micropores plus mesopores) of greater than or equal to about 0.4 and less than or equal to about 1.4, and any and all ranges and subranges therebetween, such as greater than or equal to about 0.5 and less than or equal to about 1.35, or greater than or equal to about 0.9 and less than or equal to about 1.3. It should be noted that all possible subsets of numerical ranges in between those stated herein are contemplated in this disclosure.

Accordingly, another aspect of the disclosure is an adsorbent comprising activated carbonaceous material, wherein said material comprises micropores, mesopores, and macropores, and possesses one or more of the following characteristics:

a. has a surface area as measured by BET method of greater than or equal to about 500 to less than or equal to about 1400 $m^2/g$;

b. a surface area ratio of micropores to mesopores as measured by t-plot method of greater than or equal to about 13 to less than or equal to about 17; and c. a pore volume ratio as measured by DFT method of (primary micropores):(secondary micropores plus mesopores) of greater than or equal to about 0.4 and less than or equal to about 1.4.

In one embodiment of this aspect, the adsorbent possesses characteristic a. In another embodiment, the adsorbent possesses characteristic b. In another embodiment, the adsorbent possesses characteristic c. In another embodiment, the adsorbent possesses characteristics a and b. In another embodiment, the adsorbent possesses characteristics a. and c. In another embodiment, the adsorbent possesses characteristics b. and c. In another embodiment, the adsorbent possesses characteristics a., b., and c.

As noted above, in certain embodiments, the adsorbent is in a granular or extruded form. Advantageously, such physical forms provide convenient size for adaptation into filter modules for filtration of gas streams, particularly when the adsorbents are adapted for use in a fixed bed for the purpose of filtration of such streams.

In some embodiments, the dilute acid is utilized in a concentration of about 0.05 to about 1.0 M, about 0.05 to about 0.9M, about 0.05 to about 0.8M, about 0.05 to about 0.7M, about 0.05 to about 0.6M, about 0.05 to about 0.5M, about 0.05 to about 0.4M, about 0.05 to about 0.3M, about 0.05 to about 0.2M, about 0.05 to about 0.1M, about 0.1 to about 1.0 M, about 0.1 to about 0.9M, about 0.1 to about 0.8M, about 0.1 to about 0.7M, about 0.1 to about 0.6M, about 0.1 to about 0.5M, about 0.1 to about 0.4M, about 0.1 to about 0.3M, about 0.1 to about 0.2M, about 0.2 to about 1.0 M, about 0.2 to about 0.9M, about 0.2 to about 0.8M, about 0.2 to about 0.7M, about 0.2 to about 0.6M, about 0.2 to about 0.5M, about 0.2 to about 0.4M, about 0.2 to about 0.3M, and all ranges and subranges therebetween, in water.

In some embodiments, the acid is a mineral acid and, in some embodiments, the mineral acid is sulfuric acid.

A further aspect of the disclosure is an adsorbent comprising a granular or extruded activated carbonaceous material, wherein said material has been treated with at least one acid having a pKa from about 1 to about 5, such as a mineral acid or organic acid, which has been treated with a solution of the acid at a concentration of about 0.05 to 1.0M, and washed with water.

Referring to the experimental details below, the treated carbon was exposed to a continuous stream of a set concentration of the target contaminant and its removal efficiency (calculated as RE=100*(1−concentration after passing through the adsorbent bed/challenge concentration) was measured. The capacity is the amount of target contaminant that the adsorbent is able to remove and is calculated by the time taken to reach specific RE (removal efficiency) and the concentration that the adsorbent is exposed to.

The adsorbents of this aspect provided improved removal characteristics for trimethylsilanol and exhibited a capacity at 70% RE, in ppb-hours of about 63,000.

A further aspect comprises a filter comprising the adsorbent of any of the aspects herein.

Referring to the data in FIG. 1, the data, as explained in more detail in Example 1, shows the impact of treatment on GAC (Granulated Activated Carbon) A on the TMS removal capability of the carbon. GAC A shows a capacity of ~21,000 ppb-hrs. which after surface modification (GAC B) shows a 3× capacity increase of 63,000 ppb-hrs. GAC C is not shown in FIG. 1 because its initial removal efficiency is below 70% which is considered as the end of this test.

Figure 2:
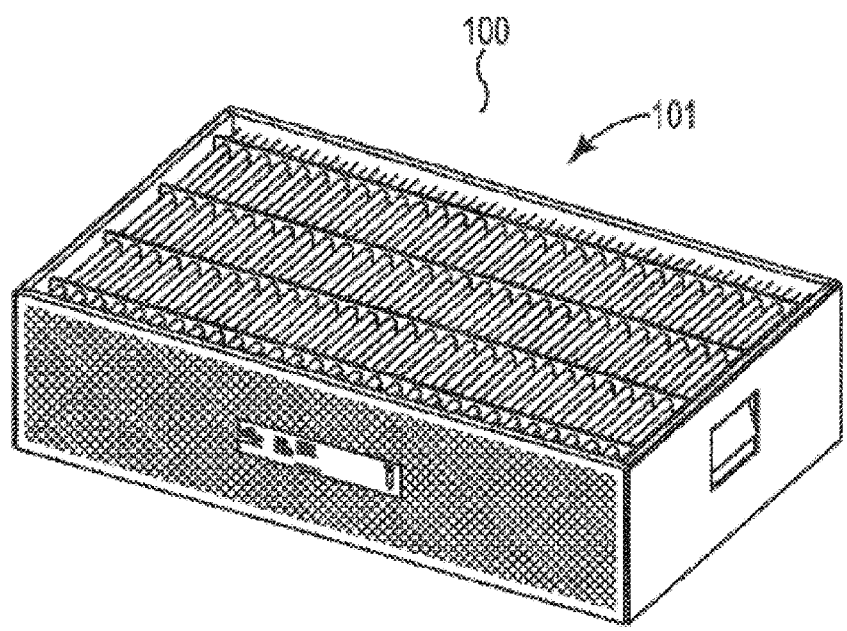
FIG. 2 is an example of a filter of a type which can be utilized with the modified activated carbon of the present disclosure.

FIG. 2 is a diagram of a filter cartridge system 100 in accordance with a version of the disclosure as a means for housing the modified activated carbonaceous material of the disclosure. A disposable filter cartridge 101 can fit within a reusable metal frame (not shown). See also, U.S. Patent Publication No. 2019/0291027 A1, incorporated herein by reference in its entirety.

EXAMPLES

Example 1

A 20 g sample of a coconut shell-derived granular activated carbon (GAC), (60% minimum activity—$CCl_4$), was placed in a beaker and treated with 50 mL of 0.1M $H_2SO_4$, and allowed to stand for 15 minutes at room temperature. Subsequently, the mixture was stirred for 4 hours and then allowed to stand and settle for about 30 minutes, at which point the pH was determined to be 2.101. The resulting carbonaceous material was drained and rinsed with deionized water (2×). The carbonaceous material was then placed in an oven at 210° C. with no airflow and dried for 24 hours.

Characterization of Carbonaceous Materials

The following tables describes the various physical attributes of a granulated activated carbon of the disclosure.

TABLE 1

| Identifier | Base Carbon Type | Treatment |
|---|---|---|
| GAC A | Granulated activated carbon obtained commercially which was derived from coconut shells | None |
| GAC B | GAC A | GAC A sample was subjected to the treatment as set forth in Example 1 with dilute mineral acid |
| GAC C | GAC A | GAC A sample, which was obtained commercially, had been treated with 3.75M mineral acid and dried at room temperature |

In Table 2 below, the surface area (SA) is determined using an Autosorb iQ instrument available from Anton-Paar with the instrument set to use the BET (Brunauer, Emmett and Teller) method. This data is thus expressed in units of area per mass of sample ($m^2/g$).

In Table 2 below, the pore volume (PV), and the pore size distribution (PSD) for the pore volume and surface area is determined using an Autosorb iQ instrument available from Anton-Paar with the instrument set to use the DFT (Density Functional Theory) method. DFT is based on molecular modelling and takes into account direct interaction of adsorbate with the adsorbent surface, micropore filling process (not a condensation process) the development of the adsorbed film thickness, and capillary condensation (adsorption) and capillary evaporation (desorption). In the table below PV is pore volume and SA is surface area.

TABLE 2

| Adsorbent | BET Surface area $m^2/g$ | DFT-PV cc/g | PSD (DFT)-PV | | | PSD (DFT)-SA | | | PV ratio[a] | SA ratio[b] |
|---|---|---|---|---|---|---|---|---|---|---|
| | | | <0.8 nm | 0.8-<2 nm | 2-50 nm | <0.8 nm | 0.8-<2 nm | 2-50 nm | | |
| GAC A | 1149 | 0.44 | 0.27 | 0.13 | 0.05 | 935 | 254 | 73 | 1.5 | 2.9 |
| GAC B | 1165 | 0.47 | 0.26 | 0.14 | 0.07 | 907 | 266 | 84 | 1.3 | 2.6 |
| GAC C | 438 | 0.18 | 0.06 | 0.08 | 0.04 | 182 | 153 | 49 | 0.5 | 0.9 |

[a]Pore Volume Ratio based on DFT: ((primary micropore)/(secondary micropore + mesopore))
[b]Surface Area Ratio based on DFT: ((primary micropore)/(secondary micropore + mesopore))

The information in Table 3—pore volume, micropore surface area, external surface area, and surface area ratio is obtained is determined using the Autosorb iQ instrument available from Anton-Paar calculated using the t-plot method.

TABLE 3

| | t-plot | | | |
|---|---|---|---|---|
| Adsorbent | Pore Volume (cc/g) | Micropore Surface Area ($m^2/g$) | External Surface Area (less micropore) ($m^2/g$) | Surface Area Ratio (Micropore/Mesopore) |
| GAC A | 0.43 | 1088 | 61 | 18 |
| GAC B | 0.43 | 1085 | 81 | 14 |
| GAC C | 0.16 | 396 | 42 | 9 |

As can be seen in Table 2 above the PV ratio for treated samples GAC B and C decreased compared to untreated sample GAC A. As can be seen in Table 3 above the Surface Area Ratio for treated samples GAC B and C decreased compare to untreated sample GAC A.

Aspects

In a first aspect, the disclosure provides an adsorbent comprising an activated carbonaceous material, wherein said material has been treated with a solution of an acid having a pKa from about 1 to about 5 at a concentration of about 0.05 to 1.0M, and washed with water.

In a second aspect, the disclosure provides the adsorbent of the first aspect, wherein the acid is a mineral acid is chosen from hydrochloric acid, sulfuric acid, phosphoric acid, hydrobromic acid and nitric acid.

In a third aspect, the disclosure provides the adsorbent of the first or second aspects, wherein the mineral acid is sulfuric acid, in a concentration of about 0.05M to about 0.5M.

In a fourth aspect, the disclosure provides the adsorbent of the first aspect, wherein the acid is an organic acid.

In a fifth aspect, the disclosure provides an adsorbent comprising an activated carbonaceous material, wherein said material comprises (i) micropores, said micropores comprising primary micropores and secondary micropores, (ii) mesopores, and (iii) macropores, and possesses the following characteristic: a surface area ratio of micropores to mesopores measured using t-plot method of greater than or equal to about 13 to less than or equal to about 17.

In a sixth aspect, the disclosure provides an adsorbent comprising an activated carbonaceous material, wherein said material comprises (i) micropores, said micropores comprising primary micropores and secondary micropores, (ii) mesopores, and (iii) macropores, and possesses the following characteristic:
  a. a pore volume ratio of (primary micropores):(secondary micropores plus mesopores) measured using DFT method of greater than or equal to about 0.4 and less than or equal to about 1.4.

In a seventh aspect, the disclosure provides the adsorbent of the fifth or sixth aspect, wherein the micropores possess a surface area measured using BET method of greater than or equal to about 500 to less than or equal to about 1400 $m^2/g$.

In an eighth aspect, the disclosure provides the adsorbent of the fifth through seventh aspects, wherein the micropores possess a surface area measured using BET method of greater than or equal to about 900 to less than or equal to about 1200 $m^2/g$.

In a ninth aspect, the disclosure provides the adsorbent of any of the fifth through eighth aspects, wherein the micropores possess a surface area measured using BET method of greater than or equal to about 1050 to less than or equal to about 1150 $m^2/g$.

In a tenth aspect, the disclosure provides the adsorbent of any of the fifth through ninth aspects, wherein the surface area ratio of micropores to mesopores measured using t-plot method is greater than or equal to about 13 to less than or equal to about 15.

In an eleventh aspect, the disclosure provides the adsorbent of any of the fifth through tenth aspects, wherein the surface area ratio of micropores to mesopores measured using t-plot method is about 14.

In a twelfth aspect, the disclosure provides the adsorbent of any of the fifth through eleventh aspects, wherein the pore volume ratio of (primary micropores):(secondary micropores plus mesopores) measured using DFT method is greater than or equal to about 0.5 to less than or equal to about 1.35.

In a thirteenth aspect, the disclosure provides the adsorbent of any of the fifth through twelfth aspects, wherein the pore volume ratio of (primary micropores):(secondary micropores plus mesopores) measured using DFT method is greater than or equal to about 0.9 and less than or equal to about 1.3.

In a fourteenth aspect, the disclosure provides the adsorbent of the first through the thirteen aspects, wherein the carbonaceous material is derived from coconut shells.

In a fifteenth aspect, the disclosure provides a filter comprising the adsorbent of any one of the first through fourteenth aspects.

In a sixteenth aspect, the disclosure provides a method for removing a contaminant from a gas stream, the method comprising:
  contacting said gas stream with an adsorbent comprising an activated carbonaceous material which has been treated with a dilute solution of at least one acid having a pKa from about 1 to about 5, followed by washing with water and drying,
  wherein the contaminant is chosen from (i) $C_1$-$C_{20}$ alkyl silanols, (ii) $C_1$-$C_{20}$ silanols substituted by one or more halogen atoms, and (iii) compounds of the formula

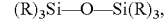

wherein R is chosen from $C_1$-$C_{20}$ alkyl and $C_1$-$C_{20}$ alkyl substituted by one or more halogen atoms.

In a seventeenth aspect, the disclosure provides the method of the fifteenth aspect, wherein the gas stream is comprised of a gas chosen from air, nitrogen, oxygen, or an inert gas.

In an eighteenth aspect, the disclosure provides the method of the fifteenth or seventeenth aspects, wherein the contaminant is chosen from trimethyl silanol, triethyl silanol, tripropyl silanol, triiospropyl silanol, and tributyl silanol.

In a nineteenth aspect, the disclosure provides the method of the sixteenth, seventeenth, or eighteenth aspects, wherein the contaminant is trimethylsilanol.

In a twentieth aspect, the disclosure provides the method of the sixteenth or seventeenth aspects, wherein the contaminant is a compound chosen from:
  $(CH_3)_3Si—O—Si(CH_3)_3$; $(CH_3CH_2)_3Si—O—Si(CH_2CH_3)_3$; hexamethylcyclotrisiloxane, octamethyltrisiloxane, octamethylcyclotetrasiloxane, decamethylcyclopentasiloxane, decamethyltetrasiloxane, dodecamethylpentasiloxane, dodecamethylcyclohexasiloxane, or any combination thereof.

In a twenty-first aspect, the disclosure provides the method of any one of the sixteenth through the nineteenth aspects, wherein the gas stream is air and the contaminant is trimethylsilanol.

In a twenty-second aspect, the disclosure provides the method of any one of the sixteenth through the twenty-first aspects, wherein the adsorbent is an activated carbonaceous material which has been treated with a solution of sulfuric acid at a concentration of about 0.05 to 1.0M, and washed with water.

In a twenty-third aspect, the disclosure provides the method of any one of the sixteenth through the twenty-first aspects, wherein the adsorbent is an activated carbonaceous material, which has been treated with a solution of sulfuric acid at a concentration of about 0.05M to about 0.15M in water.

In a twenty-fourth aspect, the disclosure provides the method of any one of the sixteenth through the twenty-third aspects, wherein the activated carbonaceous material is granular or extruded activated carbon.

In a twenty-fifth aspect, the disclosure provides the method of any one of the sixteenth through the twenty-fourth aspects, wherein the activated carbonaceous material is derived from a lignin source.

In a twenty-sixth aspect, the disclosure provides the method of any of the sixteenth through the twenty-fourth aspects, wherein the activated carbonaceous material is derived from coconut shells.

In a twenty-seventh aspect, the disclosure provides the method of any of the sixteenth through twenty-sixth aspects, wherein the acid is a mineral acid or an organic acid.

Having thus described several illustrative embodiments of the present disclosure, those of skill in the art will readily appreciate that yet other embodiments may be made and used within the scope of the claims hereto attached. Numerous advantages of the disclosure covered by this document have been set forth in the foregoing description. It will be understood, however, that this disclosure is, in many respects, only illustrative. The disclosure's scope is, of course, defined in the language in which the appended claims are expressed.

What is claimed is:

1. An adsorbent comprising an activated carbonaceous material, wherein said material comprises:
   (i) micropores, said micropores comprising primary micropores and secondary micropores, wherein a pore width of the primary micropores is greater than 0 nm but less than 0.8 nm, and wherein the pore width of the secondary micropores is greater than or equal to 0.8 nm and less than 2 nm,
   (ii) mesopores, and
   (iii) macropores, wherein the material possesses a surface area ratio of micropores to mesopores measured using t-plot method of greater than or equal to about 13 to less than or equal to about 17, and wherein said material has been treated with a solution of an acid having a pKa from about 1 to about 5 at a concentration of about 0.05 M to 1.0 M and washed with water.

2. The adsorbent of claim 1, wherein a pore volume ratio of (primary micropores):(secondary micropores plus mesopores) measured using DFT method is greater than or equal to about 0.4 and less than or equal to about 1.4.

3. The adsorbent of claim 1, wherein the acid is a mineral acid chosen from hydrochloric acid, sulfuric acid, phosphoric acid, hydrobromic acid and nitric acid.

4. The adsorbent of claim 3, wherein the mineral acid is sulfuric acid, in a concentration of about 0.05 M to about 0.5 M.

5. The adsorbent of claim 1, wherein the acid is an organic acid.

6. The adsorbent of claim 1, wherein the material has a surface area measured using BET method of greater than or equal to about 500 $m^2/g$ to less than or equal to about 1400 $m^2/g$.

7. The adsorbent of claim 1, wherein the material has a surface area measured using BET method of greater than or equal to about 900 $m^2/g$ to less than or equal to about 1200 $m^2/g$.

8. The adsorbent of claim 1, wherein the surface area ratio of micropores to mesopores measured using t-plot method is greater than or equal to about 13 to less than or equal to about 15.

9. The adsorbent of claim 1, wherein the surface area ratio of micropores to mesopores using t-plot method is about 14.

10. The adsorbent of claim 1, wherein the pore volume ratio of (primary micropores):(secondary micropores plus mesopores) using DFT method is greater than or equal to about 0.5 to less than or equal to about 1.35.

11. The adsorbent of claim 1, wherein the pore volume ratio of (primary micropores):(secondary micropores plus mesopores) using DFT method is greater than or equal to about 0.9 and less than or equal to about 1.3.

12. A filter comprising the adsorbent of claim 1.

13. An adsorbent comprising an activated carbonaceous material, wherein said material comprises:
   (i) micropores, said micropores comprising primary micropores and secondary micropores, wherein a pore width of the primary micropores is greater than 0 nm but less than 0.8 nm, and wherein the pore width of the secondary micropores is greater than or equal to 0.8 nm and less than 2 nm,
   (ii) mesopores, and
   (iii) macropores,
wherein the material possesses a pore volume ratio of (primary micropores):(secondary micropores plus mesopores) measured using DFT method of greater than or equal to about 0.4 and less than or equal to about 1.4, and wherein said material has been treated with a solution of an acid having a pKa from about 1 to about 5 at a concentration of about 0.05 M to 1.0 M and washed with water.

14. The adsorbent of claim 13, wherein the material has a surface area measured using BET method of greater than or equal to about 500 $m^2/g$ to less than or equal to about 1400 $m^2/g$.

15. The adsorbent of claim 13, wherein the material has a surface area measured using BET method of greater than or equal to about 900 $m^2/g$ to less than or equal to about 1200 $m^2$ g.

16. The adsorbent of claim 13, wherein the surface area ratio of micropores to mesopores measured using t-plot method is greater than or equal to about 13 to less than or equal to about 15.

17. The adsorbent of claim 13, wherein the surface area ratio of micropores to mesopores using t-plot method is about 14.

18. The adsorbent of claim 13, wherein the pore volume ratio of (primary micropores):(secondary micropores plus mesopores) using DFT method is greater than or equal to about 0.5 to less than or equal to about 1.35.

19. The adsorbent of claim 13, wherein the pore volume ratio of (primary micropores):(secondary micropores plus mesopores) using DFT method is greater than or equal to about 0.9 and less than or equal to about 1.3.

20. A filter comprising the adsorbent of claim 13.

* * * * *